TUNING MEANS FOR RESONANT TRANSMISSION LINES

Filed May 31, 1946

INVENTOR
JOHN C. ACHENBACH
BY H. G. Grover
ATTORNEY

May 1, 1951 J. C. ACHENBACH 2,551,228

TUNING MEANS FOR RESONANT TRANSMISSION LINES

Filed May 31, 1946 5 Sheets-Sheet 2

INVENTOR
JOHN C. ACHENBACH
BY H. G. Grover
ATTORNEY

May 1, 1951.

J. C. ACHENBACH 2,551,228

TUNING MEANS FOR RESONANT TRANSMISSION LINES

Filed May 31, 1946

5 Sheets-Sheet 3

INVENTOR
JOHN C. ACHENBACH
BY H. G. Grover
ATTORNEY

May 1, 1951 J. C. ACHENBACH 2,551,228

TUNING MEANS FOR RESONANT TRANSMISSION LINES

Filed May 31, 1946 5 Sheets-Sheet 4

INVENTOR
JOHN C. ACHENBACH
BY H. G. Grover
ATTORNEY

INVENTOR
JOHN C. ACHENBACH
BY
H. G. Grover
ATTORNEY

Patented May 1, 1951

2,551,228

UNITED STATES PATENT OFFICE 2,551,228

TUNING MEANS FOR RESONANT TRANSMISSION LINES

John C. Achenbach, Haddonfield, N. J., assignor to Radio Corporation of America, a corporation of Delaware Application May 31, 1946, Serial No. 673,278

9 Claims. (Cl. 178—44)

The present invention relates to high frequency tuning apparatus and more particularly, but not necessarily exclusively, to novel tuning arrangements and tuning controls for such apparatus.

The present invention is in some aspects thereof, an improvement on the tuning arrangement disclosed and claimed in the copending application for United States Letters Patent of Alfred H. Turner, Serial No. 575,303, filed January 30, 1945, now Patent No. 2,522,973, issued September 19, 1950.

Briefly, in the Turner application just referred to, tunable transmission lines are associated together to form a tuning system of such character that any one of a plurality of incoming signals may be selected. In addition to the function of selecting a particular incoming signal, means are provided for tuning an oscillator and for tuning a detector, the tuning in each case being obtained by changing the constants of the transmission line associated with each of these elements. The output of the tuner is an intermediate frequency signal.

In accordance with the present invention, the arrangement of the tuned circuits may be considered as transmission lines and will be referred to hereinafter as such. Each one is, perhaps, more correctly speaking, a "quasi-line" because its constants are not uniformly distributed along its length as in a true transmission line, but instead, the inductances constituting the line are lumped between predetermined points. The capacitances which are necessarily present as line constants are also, in effect, lumped, except that the major tuning capacitances are not provided as separate physical elements or components but exist as inherent capacity affects in the apparatus. The predetermined points just referred to are available as contacts across which a short circuiting element may be bridged. The improvements to be described herein reside primarily in the physical disposition of each transmission line within the tuner as well as in the novel form which the lumped constants or elements take. Novel means are also provided for adjusting the magnitude of certain of the individual tuning elements.

The principal object of the present invention is to provide a novel high frequency tuner.

Another object of the invention is to provide a novel high frequency tuner employing a plurality of tunable transmission lines, each having rotary short circuiting means.

A further object of the invention is to provide in a high frequency tuner a tunable transmission line composed of inductance elements which are novel in form.

Still another object is to provide novel means for tuning the lumped elements of a resonant transmission line.

A still further object is to provide a novel variable condenser.

Other and more specific objects of the invention will become apparent from a consideration of the following specification and claims in connection with the accompanying drawings in which:

Figure 3:
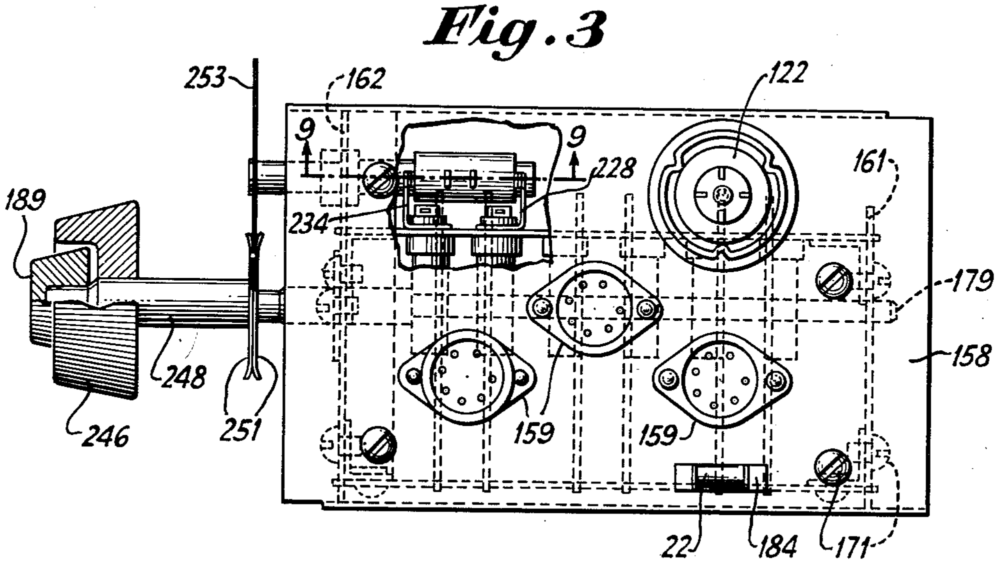
Fig. 3 is a top plan view, partially in section, of the tuner of Fig. 2.
Figure 7:
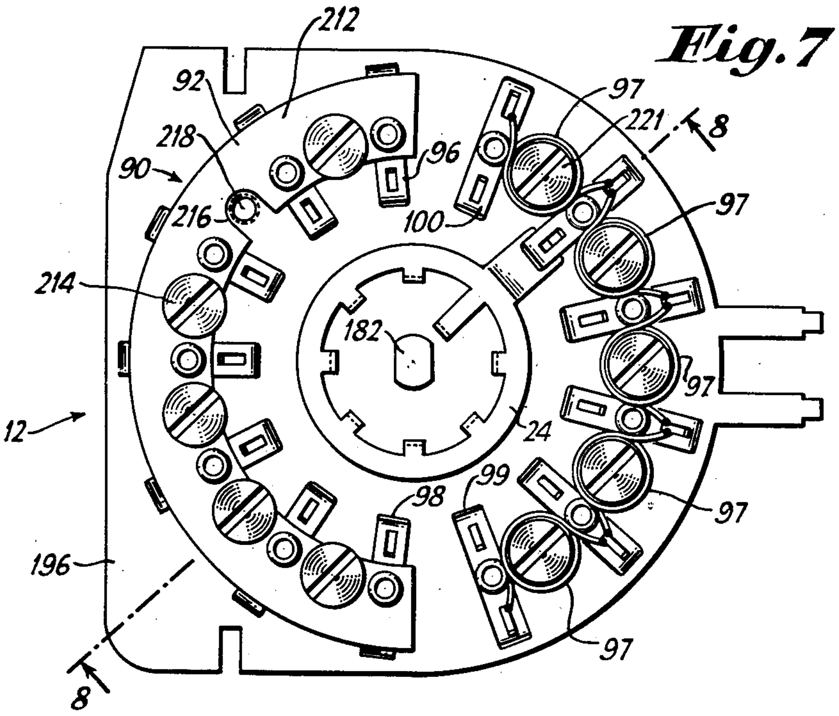
Figure 6:
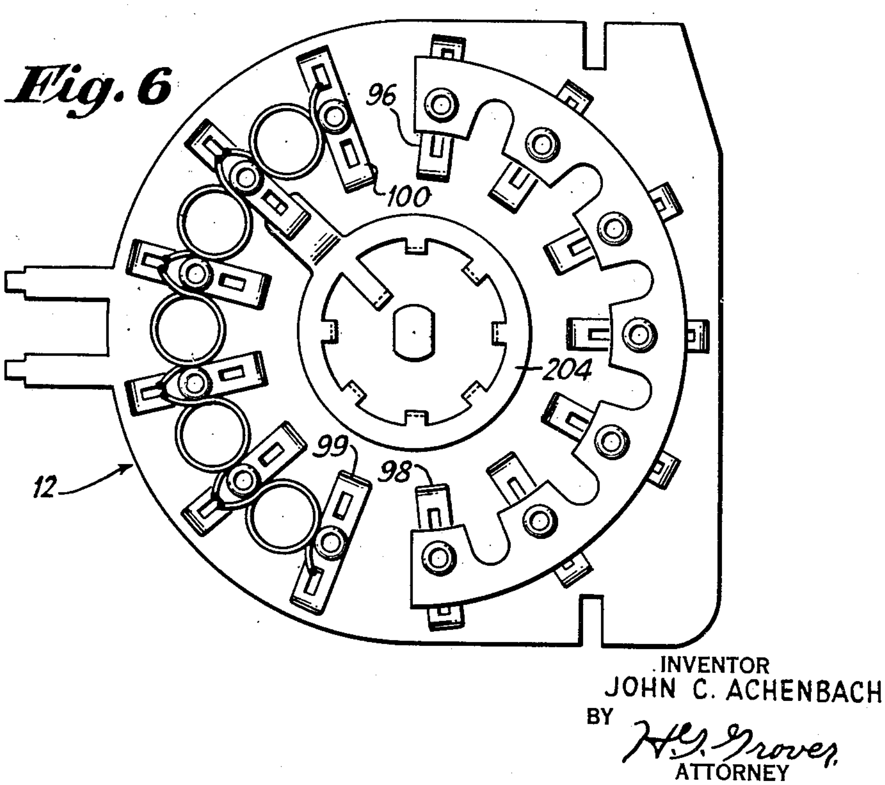
Figure 5:
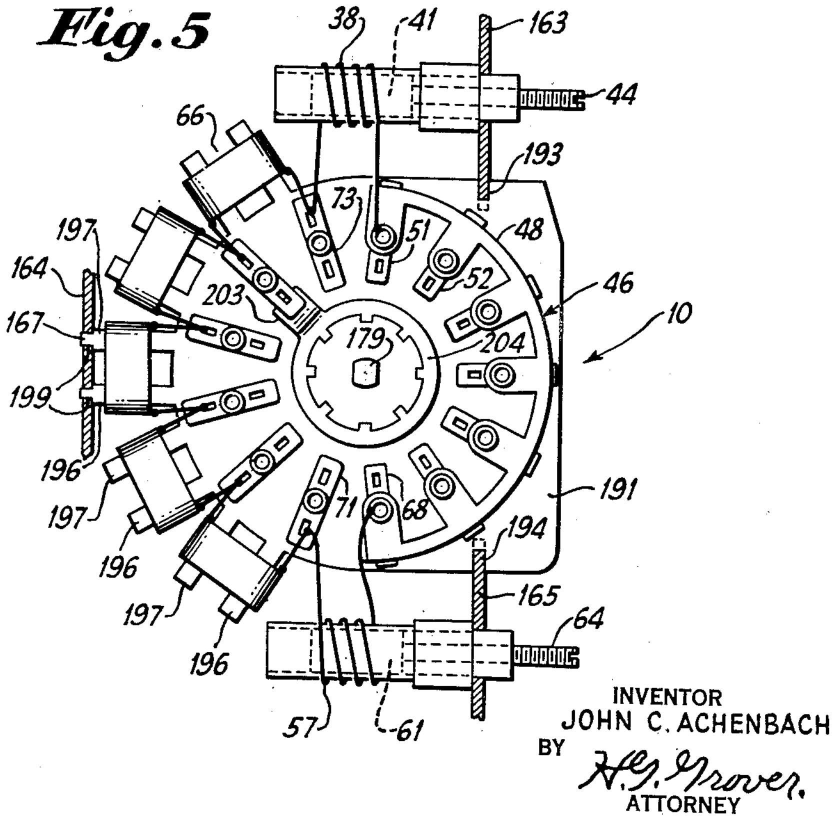
Figure 8:
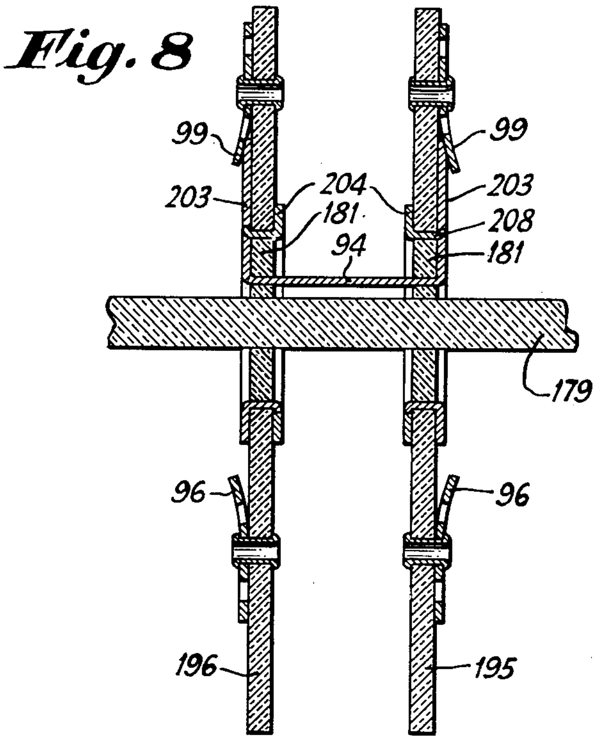
Figure 9:
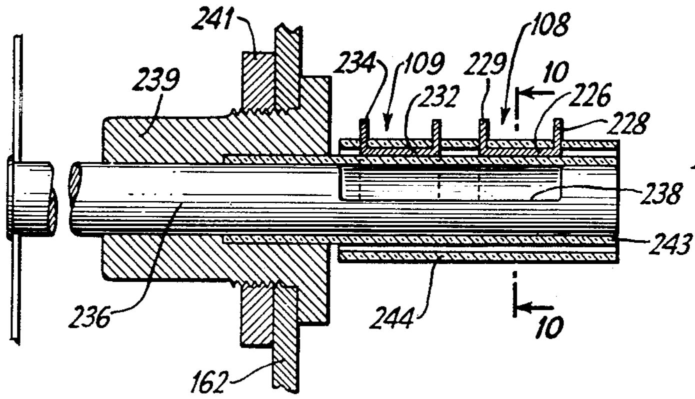
Figure 10:
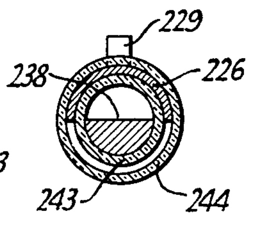

Figs. 5, 6, and 7 are detail views of certain of the transmission lines and their mountings;

Fig. 8 is a section taken on line 8—8 of Fig. 7 as viewed in the direction of the arrows;

Fig. 9 is a fragmentary cross section taken on line 9—9 of the pair of rotary condensers appearing in Fig. 3; and Fig. 10 is a section on line 10—10 of Fig. 9.

Figure 1:
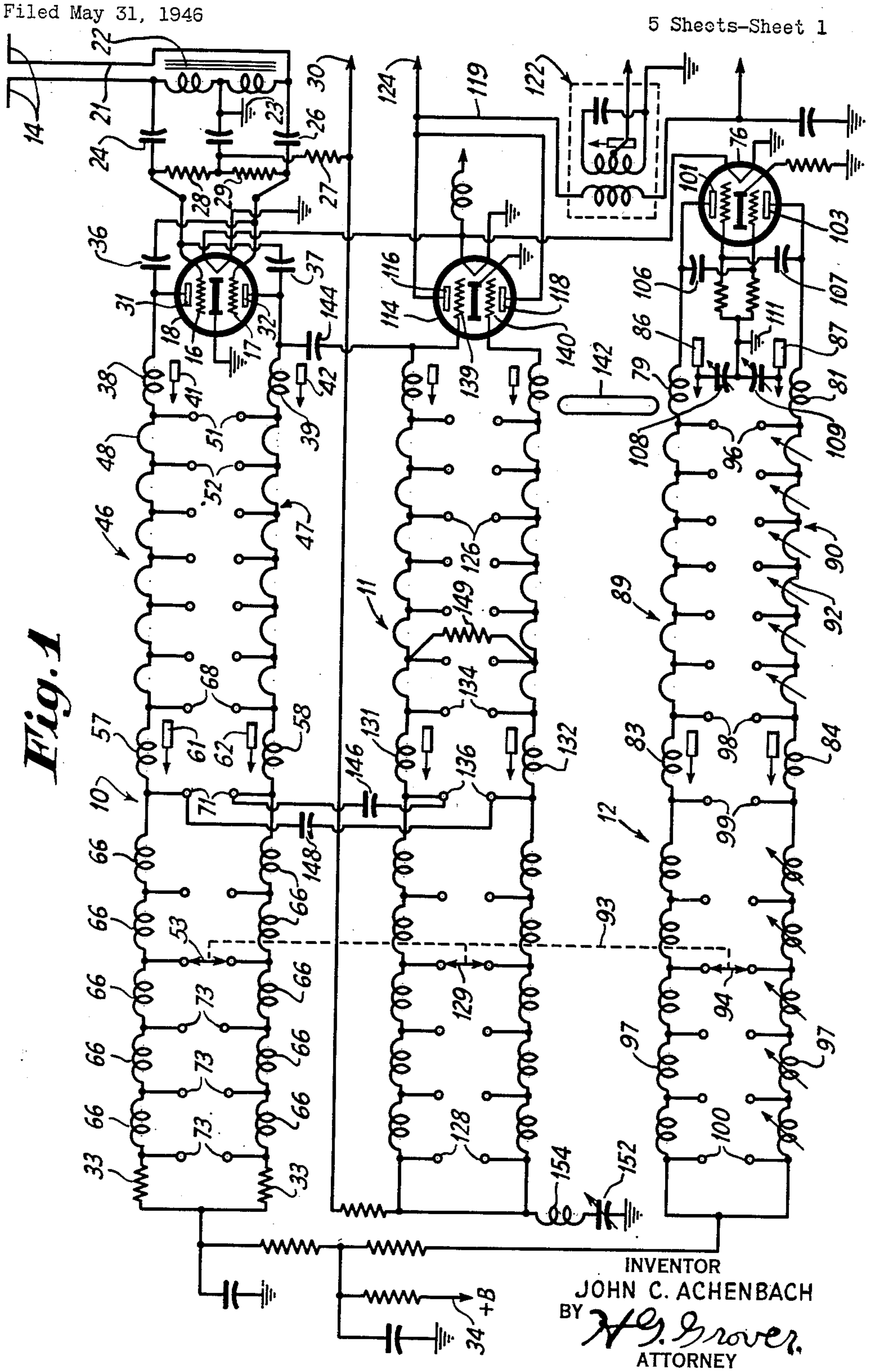
Fig. 1 is a schematic circuit diagram of the novel superheterodyne tuner of the invention.

Referring for the present to Fig. 1 of the drawings, which shows the electrical features of the embodiment of the tuner selected for illustrating the invention, it will be seen that the R. F. amplifier, oscillator and converter of a superheterodyne receiver are shown schematically. The circuit generally is similar to that disclosed in the above noted Turner application Serial No. 575,303, now Patent No. 2,522,973, and comprises three resonant line sections indicated generally by the reference characters 10, 11 and 12. These resonant lines form the tunable means for an R. F. amplifier, a converter or mixer and an oscillator. The tuner selected as an illustrative embodiment of the invention provides for the selection of 13 radio frequency signals or channels ranging from 44 mc. (megacycles) to 216 mc. These figures are given solely by way of example, since it will be understood that while the tuner of the illustrative embodiment is designed for these high frequencies, yet numerous features of the invention are equally applicable in tuners operating in a still higher or a lower frequency range. Moreover, while a superheterodyne type of receiver has been referred to in the brief description so far given in connection with Fig. 1 of the drawings, there are features present therein to be pointed out hereinafter, which are an important part of applicant's invention and which may be used in variable impedance devices generally, testing instruments, and the like.

The physical counterparts of the circuit elements shown schematically in Fig. 1 will be given the same reference characters where they appear in Figs. 2 to 10. Before describing the structure and location of the elements shown in Fig. 1 which appear in the other figures of the drawing, general circuit connections will be briefly described.

Considering the R. F. amplifier portion of the tuner, incoming signals at the antenna 14 are applied to the control grids 16 and 17 of the duplex vacuum tube 18 having two triode sections. Any desired kind or type of transmission line 21 is interposed between the antenna 14 and the broadly tuned input section of the R. F. amplifier. This input section comprises a center tapped inductance 22, the mid-point of which is grounded at 23. This inductance serves as a low impedance grounded path to undesired signals in push-push phase relationship such as would be picked up by the transmission line 21. The grids 16 and 17 are coupled to the transmission line 21 through coupling condensers 24 and 26. An AVC or manually controlled bias from any suitable source 30 (not shown in detail) is supplied by way of a resistor 27 and the transmission line matching resistors 28 and 29. The arrangement so far described is balanced with respect to ground. The plates 31 and 32 of the two triode sections of the tube 18 are connected to each side of the tunable transmission line 10. Each side of the line 10 is substantially identical and the two sides are joined through balancing resistors 33 to a suitable source of high positive potential (not shown) by way of a connection 34.

The R. F. amplifier is neutralized by neutralizing condensers 36 and 37 interconnecting the plate of one triode section with the grid of the other section. The initial inductances 38 and 39 of the transmission line 10 are tunable by cores 41 and 42 respectively. These cores are preferably of powdered ferrous metal and each is provided with an adjusting screw 44 (Fig. 5).

Figure 2:
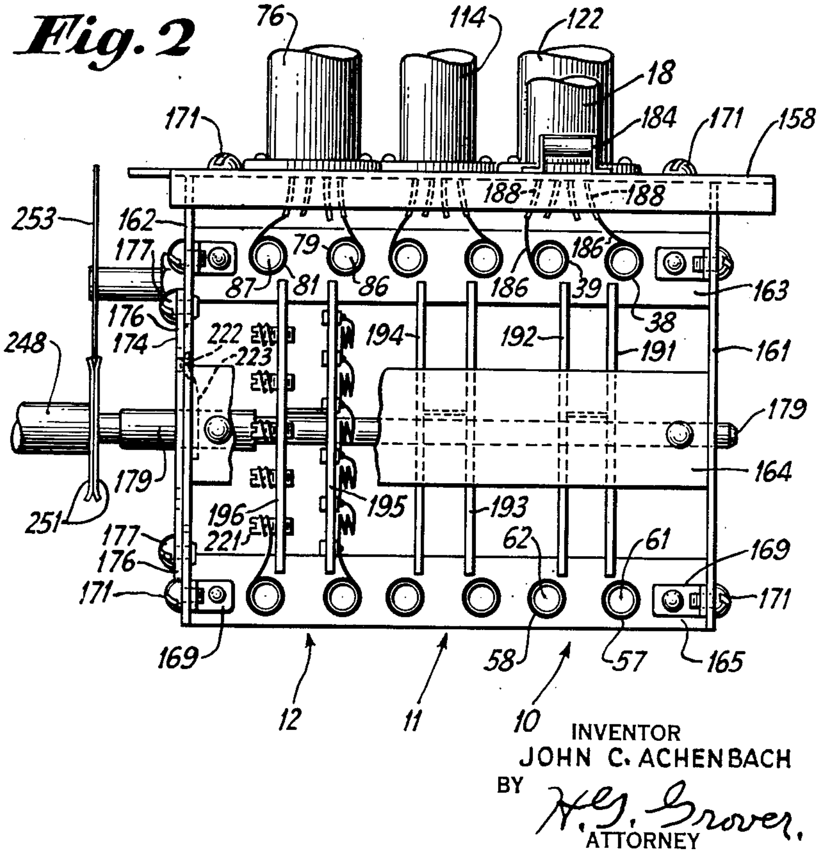
Fig. 2 is a side elevational view of a physical embodiment of the tuner of this invention.

The next series of inductances are indicated generally by reference characters 46 and 47 and each may be in the form of a metallic bar as shown by Fig. 5. Each elementary inductance section 48 lies between a pair of shorting contacts 51 and 52. A shorting bar for the shorting contacts is shown schematically and is indicated by reference character 53. The comparatively wide frequency range of the illustratively shown tuner requires a relatively large lumped inductance between two groups of receivable frequencies or frequency bands and the required lumped inductances are provided by coils 57 and 58 tunable by metallic cores 61 and 62. These cores also are preferably of powdered ferrous metal and are adjustable by adjusting screws 64 (Figs. 2 and 5).

The remaining inductances 66 for the line 10 are five in number for each side in the illustrative example. These inductances 66 are relatively large and are wound in binocular or figure-eight coil form as shown more in detail in Fig. 5 of the drawings. Suitable binocular or figure eight coils are shown and described in my co-pending application for U. S. Letters Patent, Serial No. 606,807, filed July 24, 1945, published in the United States Patent Office Official Gazette February 7, 1950, and subsequently abandoned. The coils disclosed therein are suitable and a preferred type of coil is shown at D in Fig. 1. It will be understood, however, that a simple self-supported solenoid winding may be used, and, in fact, has been proven very effective in practice when employed in a tuner incorporating features of this invention.

Pairs of shorting contacts 68 and 71 are provided at the ends of the coils 57 and 58. Pairs of shorting contacts 73 are placed between the inductances 66. By moving the bar 53 from the shorting contacts 68 to the shorting contacts 71 a change in frequency from approximately 174 to 180 mc. down to approximately 82 to 88 mc. is obtained. This relatively large jump, approximately 92 mc., from one tuning frequency range to the other is accomplished in accordance with the present invention along all of the tunable transmission lines 10, 11, 12 simultaneously. It is effected without employing additional range switches or other troublesome equipment heretofore believed necessary.

Transmission line 12 for tuning the oscillator, which comprises triode elements of the duplex tube 76, is similar electrically to the line 10 which has just been described with the aid of the schematic showing of Fig. 1. Each side of the line 12 is similar. However, adjustments are provided for each individual line section in the oscillator circuit since a greater degree of accuracy in frequency is desirable here. Although in the illustrative embodiment these adjustments are made on one side of the line 12 only, so that they are readily accessible in a manner to be described, the degree of unbalance of this line 12 is negligible, insofar as overall performance is concerned, for the normal variation in the other frequency determining components.

To describe line 12 briefly, inductances 79 and 81 correspond in function to the inductances 38 and 39 of the line 10. Inductances 83 and 84 correspond to the inductances 57 and 58. The magnitudes of the inductances 79 and 81 are adjustable by cores 86 and 87 (Fig. 2) which are controlled by adjusting screws (not shown). The cores 86 and 87, preferably, are of brass. The tuning inductance at the high frequency end of the transmission line 12 is provided by a metal bar or strip 89 on one side of the line and a corresponding strip or bar 90 in the other side of the line. The individual inductance sections of the strip 90 are indicated by reference character 92. The separate sections 92 are adjustable in a novel method by metallic means placed near them as will be more fully described hereinafter. The inductance sections 92 are placed in or withdrawn from the oscillator tuning circuit by a short circuiting bar 94 operating over shorting contacts 96. Addition of the jump coils 83 and 84 is controlled by contacts 98 and 99. Addition of the lower frequency inductance sections 97 is controlled by the series of contacts designated 100. The bar 94 is mechanically coupled to the bars 53 and 129 as indicated by the dash line 93. In the arrangement of Figs. 2 to 8 of the drawings this is seen to be in the nature of a rotary switching arrangement. The transmission line 12 is connected to the plates 101 and 103 of the triode sections of the tube 76 and also to the source 34. The regenerative connections necessary for oscillation are provided by the plate-grid coupling condensers 106 and 107.

A fine tuning control on the oscillator is provided by capacitances 108 and 109. These capacitances are embodied in the arrangement shown more in detail in Figs. 9 and 10 of the drawings and their physical arrangement will be more fully described hereinafter. At this time it is sufficient to state that it is desirable to provide a fine tuning control on the oscillator giving a small but practically constant frequency change over the entire range of the tuner. As shown schematically, the variable capacitances are connected from the cores 86 and 87 of the highest frequeucy line sections 79 and 81 to ground at 111, for example. When the shorting bar 94 which serves as a selector switch is set in the lowest frequency position across the contacts 100 at the extreme left of the line 12, as shown in Fig. 1, the capacitances 108 and 109 in series with the core to conductor capacitances are essentially across the top or high impedance end of the line 12 and give the maximum tuning or percentage frequency change. As the shorting bar 94 is advanced for higher frequency operation the effective capacitance of the fine tuning control drops lower and lower along the line until, when the highest frequency position is reached, the effective capacitance is distributed along the lower end of the line in the vicinity of the short at the selected position of the shorting bar 94 and as a consequence gives a considerably smaller percentage frequency change. In this manner the frequency change of the fine tuning control is held practically constant throughout the tuning range of the tuner.

The converter or mixer stage previously mentioned includes a duplex vacuum tube 114. The plates 116 and 118 of the triode section of this tubes are connected in push-push relationship to an output connection 119 which, in the illustrative example, serves also as an input connection to an intermediate frequency impedance or interstage coupling device 122. Details of such an impedance are shown in a copending application for U. S. Letters Patent of Achenbach et al., Serial No. 638,780, filed January 3, 1946. The connection 124 to a suitable plate voltage source (not shown) is also provided. The transmission line 11 is substantially the same as the transmission line 10 previously described in detail. The high frequency inductances are added under the control of shorting contacts 126 and the lower frequency inductance elements are added under the control of shorting contacts 128. A shorting bar 129 travels with the previously mentioned shorting bars 53 and 94 in tuning transmission line 11 simultaneously with the tuning of the lines 10 and 12. Jump coils 131 and 132 are connected to the shorting contacts 134 and 136. The transmission line and hence the grids 139 and 140 of the triode section of tube 114 are connected to the previously mentioned AVC or manual bias connection 30.

Coupling between the several resonant lines 10, 11 and 12 is determined by their spacing. However, to fulfill the constant bandwidth requirements, the coupling is augmented at several places along the line by capacity and/or link coupling. In the arrangement of Fig. 1 link coupling between lines 11 and 12 is provided by a single turn loop or link 142. Additional coupling is provided between the lines 10 and 11 by a single coupling condenser 144 and a pair of coupling condensers 146 and 148. These latter condensers are connected between the shorting contacts 71 and 136 and their coupling effect increases as the shorting bar 53 advances toward the low frequency position. A resistor 149 serves as a load to get a single peak to offset the tight coupling provided by the condensers 146 and 148 at lower frequencies.

A variable condenser 152 is included to provide series resonance from first detector grids 139 and 140 to ground at the intermediate frequency. This arrangement provides a low impedance from grids to cathode when the plates to cathode voltage is high, thus effectively preventing degenerative feedback through the grids to plates capacitances of the first detector tube 114 and attenuating undesirable signals in the I. F. band introduced into the tuner by way of the antenna 14. The inductance 154 is included to allow a more accurate balance of the grid circuits to be maintained, and to allow the use of a capacitance value that will not give other undesirable resonances in the useful frequency range of the tuner.

The manner in which the transmission lines 10, 11 and 12 and the simultaneously operable shorting bars 53, 129, and 94 are assembled in an operable mechanism in accordance with the invention will now be described with reference to Figs. 2 to 10 of the drawings. The tuner assembly comprises a mounting member 158 (Figs. 2, 3, and 4) which provides a convenient chassis upon which the tube sockets 159 for the tubes 18, 114 and 76 are mounted. The I. F. coupling device 122 is also mounted on the plate 158. The device 122 and the sockets 159 are each positioned adjacent the transmission lines 10, 11, 12 with which they are associated so as to reduce necessary wiring to a minimum. The end plate members 161 and 162 are joined by three longitudinal strips 163, 164 and 165 of insulating material in order to provide a secure and rigid structure. The insulating strips are provided with tongues 167 at each end which are seated in spaced apertures in the end members, and securing means such as angle brackets 169 and fastening screws 171 secured at each end of each strip secure the strips to the end plates and maintain the square relationship at the point of connection. Similar brackets 169 and screws 171 serve as connecting means for connecting end plates 161 and 162 to the top plate 158. The end plate 162 has an enlarged opening 173 and it is partially covered by a disc member 174 provided with ears 176 so that it may be connected to the plate 162 by suitable fastening means such as screws 177. The end plates 161 and the disc member 174 are apertured to provide a bearing for a rotatable shaft 179 which carries a series of insulating discs 181 as best seen in Fig. 8 of the drawings. The shaft 179 is flattened at 182 or otherwise irregularly shaped as shown in Figs. 5, 6, and 7 to maintain the discs 181 in angular alignment. The end plate 161 and the shaft 179 are preferably of insulating material thereby avoiding the presenec of a metallic resonant loop in the structure of the tuner.

The top plate 158, the insulating strips 163 to 165 and the end plates provide convenient means for supporting the several resistors, condensers and inductances which are not specifically a part of the three transmission lines but which are component parts of the tuner. These parts have been omitted from the showing of Figs. 2, 3, and 4 of the drawings in the interest of clarity. For example, some of the elements are connected to leads which terminate at small terminal boards in the form of strips of insulation which are secured to the several major parts of the tuner frame where convenient access may be had.

The transformer 22 is supported on the top plate by small brackets 184. The location of this transformer provides a convenient point of connection for the antenna transmission line 21 and short leads to the grids of the R. F. amplifier tube 18. The initial inductances 38 and 39 of the transmission line 10, for example, are connected directly by very short leads 186 to the tube socket contacts prongs 188. This convenient arrangement is also employed in connecting the corresponding elements of the other lines to appropriate vacuum tube electrodes.

In accordance with an important feature of the present invention, the several transmission lines 10, 11 and 12, the electrical features of which have been described above in connection with Fig. 1 of the drawings, are disposed in the tuner in such a manner that they may be tuned by the operation of a simple rotary switch operable by a single control. This control is in the simplest form possible, being the knob 189 (Fig. 3) carried at the end of the previously mentioned shaft 179.

Each half of the transmission line 10 is mounted in a circular fashion on insulating stator plates 191 and 192 respectively. Each half of the transmission line 11 is mounted on stator plates 193 and 194 respectively. Each half of the oscillator tuning transmission line 12 is mounted on insulating plates 195 and 196 respectively. These insulating stator plates 191 to 196 are spaced apart in pairs as shown in Figs. 2 and 3 of the drawings and are all carried by the insulating strips 163 to 165. The mounting of insulating stator plate 191 shown in detail in Fig. 5 will serve to illustrate the mounting of all of these plates. The plate is notched as indicated at 193 and 194 to form a seat for the insulating strips 163 and 165 which are also notched to insure proper spacing. As mentioned previously certain of the inductances in the line 10 are in the form of figure 8 or binocular windings and these are conveniently mounted on plate 191 by providing projections or tongues 196 and 197 in spaced pairs. One of these pairs is conveniently located and is provided with the previously mentioned tongues 167 which are reduced in size to fit into apertures 199 formed in the insulating strip 164. This arrangement insures insulation of the elements of the transmission line and also determines the disposition of one line with respect to another in a rigid manner so that variations in spacing and consequent variations in electrical characteristics are avoided.

The insulating stator plate 191, as previously stated, carries the elements of one side of the previously described transmission line 10. The section 46 composed of the inductance elements 48 is in the form of a metal bar or strip. As shown at the beginning of section 46 and at the end of each inductance element 48 the contact members 51 and 52 project radially inwardly to make contact with a contact tongue 203 which is connected to or is integral with a contact ring 204 carried by the disc 181. The contact tongue 203 also is effective at the contacts 68, 71 and 73, these contacts having been referred to in the description of the schematic showing of Fig. 1.

Since the discs 181 as well as the shorting bars 53, 129, and 94 are all of substantially the same structure, a more detailed description will now be given of the shorting switch mechanism in connection with the elements carried by the insulating stator plates 195 and 196 which are shown in section in Fig. 8. The parts carried by each of the discs 181 in that figure are substantially identical, therefore they will be given the same reference characters. The ring 204 on each disc serves as a a bearing and guide which fits into the aperture in the associated insulating stator plate. For example, the disc 204 is received within a circular aperture 208 formed in the plate 195, the latter being located so that the aperture 208 is substantially concentric with the shaft 179. This positioning of the parts is assured by the previously mentioned method of mounting the insulating plates including the insulating plate 195. The shorting bar 94 (also indicated in Fig. 1) connects the adjacent metallic rings 204 together and thereby connects the contact tongues 203 together so that a contact terminal or point 99 on the plate 195 is connected to the contact terminal or point 99 on the plate 196 with the rotary shaft in the angular position indicated in Fig. 8 of the drawings.

The elements of the transmission line 11 which are disposed on the insulating plates 193 and 194 are substantially identical with the elements of the transmission line 10 and therefore no further detailed description will be given of the disposition of the parts on these insulating plates.

Further details of the adjustable half of the transmission line 12 will now be described in connection with Fig. 7 of the drawings with particular emphasis on the manner of providing adjustment for each element. The transmission line section 90 (Figs. 1 and 7) is in the form of a metallic strip or bar 212. The individual inductance elements 92 occur between the contact points 96. Tuning of these individual elements is accomplished in a novel manner by metallic screws 214. These screws are located at notches 216 in the metallic bar member 212 and are threadedly engaged in apertures 218 in the stator plate 196. One of the screws 214 is omitted from the showing of Fig. 7 so as to indicate the character of the notch 216 and the location of the aperture 218 with respect to this notch. Adjustment of the inductance 92 is accomplished by varying the distance between the plane of this inductance element and the head of the screw 214 in the vicinity of the notch. The screw may conveniently be the ordinary brass binder-head screw. As the head of the screw approaches the plane of the inductance element 92 it has more and more effect on the field of the conductor in the vicinity of the notch and reduces its inductance. The screw is at all times preferably insulated from the conductor.

The inductors 97 providing the required frequency steps in the low frequency range are or may be small self-supporting solenoid windings which are adjusted by a small core which may be of brass. As shown in Fig. 7, these cores 221 are also threaded into the insulating stator plate 196.

Figure 4:
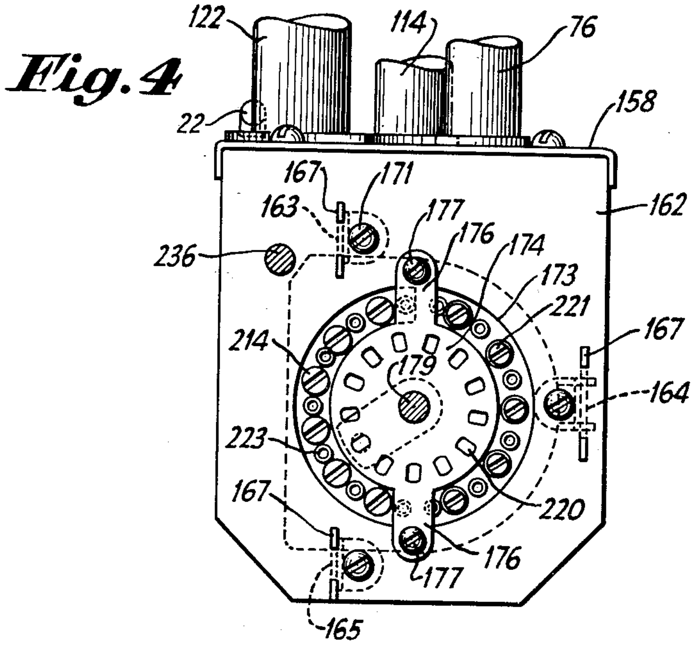
Fig. 4 is an end view of the tuner of Fig. 2.

Referring to Fig. 4 of the drawings, it will be seen that the screws 214 and the adjustable cores 221 are readily accessible for adjustment with a screw-driver from the end of the tuning device without disassembling any of the parts. The position of the rotary shaft 179 is determined by small concave recesses in the disc 174 provided by the protuberances 220 which cooperate with a detent member 222 (Fig. 2) on an arm 223 secured to the shaft 179.

The physical arrangement of the previously described fine tuning capacitances 108 and 109 shown in Fig. 1 of the drawings will now be described in detail. Figs. 1 and 2 show the location of this fine tuning arrangement with respect to the cores 86 and 87 and the mechanical drive. Figs. 9 and 10 show details of the structure. The stationary armature of the condenser 108 is provided by an arcuate metallic strip or sheet 226 which is provided with tongues 228 and 229. One of these tongues, for example 228, is connected to the tuning core 86. The stationary armature of the condenser 109 is likewise formed of a metallic strip 232, the upturned tongue 234 of which connects with the tuning core 87. The grounded rotary armature of the condenser is in the form of a shaft 236 which is notched out as indicated by the reference character 238 and is rotatably supported in a bearing member 239 secured in the end plate 162 by a nut or other suitable fastening means 241. An insulating sleeve 243 surrounds the shaft 236 and another insulating sleeve 244 surrounds the metallic sheets 226 and 232. The insulating sleeve 243 is non-rotatably seated in the bearing member 239 so that shaft 236 rotates with respect to the members 226 and 232. The shaft is mechanically driven from a knob 246 Fig. 3 secured on a hollow shaft 248 which is journalled over the shaft 197. A pair of friction discs 251 of spring-like material are mounted on the end of the hollow shaft 248 and receive a driven friction disc 253 in driving relationship between them. If the knob 246 is turned, it will be seen that the shaft 236 will be turned independently of the shaft 179.

Having now described the invention, what is claimed and desired to be secured by Letters Patent is the following:

1. In a high frequency system, a resonant transmission line having a plurality of sections of lumped impedance elements, the impedance elements of one of said sections being wound coils, another of said sections being composed of continuous metallic strips, stationary means for supporting the impedance elements of said transmission line so that the elements thereof are circularly located, short circuiting means for varying the electrical length of said line, rotatable means for carrying said short circuiting means, and means for rotating said short circuiting means whereby to vary the tuning of said transmission line.

2. In a high frequency system, a tunable transmission line comprising a pair of parallel branches, each branch composed of a series of impedance elements, a pair of spaced insulating stator plates, each carrying the impedance elements of one branch of the transmission line, short circuiting means for progressively varying the effective electrical length of said transmission line, and rotatable means substantially in the plane of said stator plates upon which said short circuiting means is mounted.

3. In a high frequency system, a plurality of tunable transmission lines, each transmission line comprising a pair of branches, each branch composed of impedance elements, stationary means upon which impedances of each branch are mounted, said means being associated in pairs and spaced so that the spacing between branches of each transmission line is less than between the spacing between the transmission lines, the spacing between transmission lines providing coupling between the lines, rotatable means substantially in the plane of said stationary means for varying the effective length of each transmission line and means for rotating said effective length varying means simultaneously.

4. In a high frequency system, a resonant transmission line, a pair of insulating supports disposed in parallel relationship for supporting the impedance elements of said transmission line, a series of spaced apart contacts carried by each insulating support, a connection from each contact to an adjacent point on the transmission line, short circuiting means for connecting a contact on one support to a contact on the other support to vary the electrical length of said line, said short circuiting means including means guided within each insulating support and means for moving said short circuiting means over the series of contacts in succession whereby to vary the tuning of said transmission line.

5. In a high frequency system, a plurality of tunable transmission lines, each transmission line comprising a pair of branches, each branch composed of inductive elements, stationary means upon which each of said branches is mounted, said means being spaced in pairs whereby the spacing between branches of a given transmission line is less than between the spacing between the transmission lines, movable short circuiting means substantially in the plane of said stationary means for varying effective length of each transmission line and means for moving said short circuiting means simultaneously.

6. A high frequency tuner comprising a plurality of balanced tunable transmission lines, each line comprising a plurality of lumped impedance means, adjacent ones of said lines having substantial mutual coupling, a plurality of insulating supporting plates disposed in parallel relationship to support the impedance elements of the transmission lines in a circular arrangement, a plurality of switching contacts mounted upon said supporting plates, one contact being connected to one end of each lumped impedance element, means for connecting corresponding lumped impedance elements in series thereby providing transmission lines each having two branches, each line being tunable by interconnecting a contact associated with an impedance element of one branch with the corresponding impedance element of the other branch, and rotatable switching means substantially in the plane of said plates for cooperating with said fixed contacts for selectively connecting together lumped impedance elements to provide simultaneous tuning of all of said lines.

7. A high frequency tuner comprising a shelf member, a pair of end plate members, each having an end secured to said shelf member, a plurality of tunable transmission lines, supports for said transmission lines comprising insulating members extending between said end plate members and secured at their ends to said end plate members, and a rotatable tuning shaft extending through a frame member and being accessible exteriorly of the tuner.

8. A high frequency tuner comprising a shelf member, a pair of frame members each having an end secured to said shelf member, a plurality of tunable transmission lines, insulating members supported from said frame members for carrying the elements of the tunable transmission lines, said elements being circularly disposed on said insulating members, vacuum tube socket devices secured on said shelf member and connections from said vacuum tube socket devices directly to said transmission lines.

9. A high frequency tuner comprising a shelf member, a pair of end plate members each having an end secured to said shelf member, a plurality of tunable transmission lines, supports for said transmission lines comprising insulating members extending between said end plate members and secured on their ends to said end plate members, insulating stator plates carried by said insulating members, the elements of said transmission lines being mounted on said insulating stator plates, and a rotatable tuning shaft extending through a frame member and accessible exteriorly of the tuner.

JOHN C. ACHENBACH.

REFERENCES CITED

The following references are of record in the file of this patent:

UNITED STATES PATENTS

| Number | Name | Date |
|---|---|---|
| 2,088,580 | Batchelder | Aug. 3, 1937 |
| 2,113,758 | Vries | Apr. 12, 1938 |
| 2,201,325 | Telegen et al. | May 21, 1940 |
| 2,206,010 | Braselton | June 2, 1940 |
| 2,259,292 | Conklin | Oct. 14, 1941 |
| 2,262,365 | Kinn | Nov. 11, 1941 |
| 2,263,376 | Blumlein | Nov. 18, 1941 |
| 2,315,159 | Moore | Mar. 30, 1943 |
| 2,332,868 | Nowak | Oct. 26, 1943 |
| 2,416,827 | George | Mar. 4, 1947 |
| 2,463,417 | Overacker | Mar. 1, 1949 |